United States Patent
Huang

(10) Patent No.: US 9,573,266 B2
(45) Date of Patent: Feb. 21, 2017

(54) EXTENSION-TYPE HOLDER

(71) Applicant: CYBER POWER SYSTEMS, INC., Taipei (TW)

(72) Inventor: Chung-Ta Huang, Taipei (TW)

(73) Assignee: CYBER POWER SYSTEMS, INC., Taipei (TW)

(*) Notice: Subject to any disclaimer, the term of this patent is extended or adjusted under 35 U.S.C. 154(b) by 0 days.

(21) Appl. No.: 14/865,719

(22) Filed: Sep. 25, 2015

(65) Prior Publication Data

US 2016/0297062 A1 Oct. 13, 2016

(30) Foreign Application Priority Data

Apr. 13, 2015 (TW) .............................. 104111824 A

(51) Int. Cl.
| | | |
|---|---|---|
| B25G 1/04 | (2006.01) | |
| B25J 1/04 | (2006.01) | |
| F16B 7/10 | (2006.01) | |
| F16M 13/04 | (2006.01) | |
| F16M 11/24 | (2006.01) | |
| F16M 11/28 | (2006.01) | |
| F16M 11/04 | (2006.01) | |
| F16M 11/14 | (2006.01) | |
| F16B 2/12 | (2006.01) | |

(52) U.S. Cl.
CPC .. B25G 1/04 (2013.01); B25J 1/04 (2013.01); F16B 7/105 (2013.01); F16M 11/041 (2013.01); F16M 11/14 (2013.01); F16M 11/242 (2013.01); F16M 11/28 (2013.01); F16M 13/04 (2013.01); F16B 2/12 (2013.01)

(58) Field of Classification Search
CPC .............. F16B 7/105; F16B 2/12; B25G 1/04; B25J 1/02; B25J 1/04; F16M 13/04; F16M 13/06; F16M 11/041; F16M 11/14; F16M 11/242; F16M 11/28; G03B 17/561; G03B 17/563
USPC .. 294/209, 210, 139; 396/420, 428; 348/376
See application file for complete search history.

(56) References Cited

U.S. PATENT DOCUMENTS

| | | | | |
|---|---|---|---|---|
| 8,915,660 B1* | 12/2014 | Ben Yehuda | ........ | F16M 11/041 396/420 |
| 2005/0207749 A1* | 9/2005 | Barker | ................... | F16M 11/14 396/428 |
| 2007/0053680 A1* | 3/2007 | Fromm | .................. | F16M 11/14 396/420 |
| 2013/0293731 A1 | 11/2013 | Kim | | |

FOREIGN PATENT DOCUMENTS

DE 20 2014 008 938 * 1/2015

* cited by examiner

*Primary Examiner* — Dean Kramer
(74) *Attorney, Agent, or Firm* — Bacon & Thomas, PLLC

(57) ABSTRACT

An extension-type holder comprising a cover, a movable base, a tube and an extensible rod assembly, the cover has an eccentric rod, the movable base has an eccentric pipe, a rotating joint is disposed between the extensible rod assembly and the tube, wherein the eccentric pipe can contain the eccentric rod, the tube can contain the movable base, a holding space can be formed between a cover and a movable base when the eccentric rod and the movable base is in an extending state.

26 Claims, 23 Drawing Sheets

EXTENSION-TYPE HOLDER

BACKGROUND OF THE INVENTION

1. Field of the Invention

The invention relates to an extension-type holder and more particularly to an extension-type holder uses an eccentric rod to form a holding space between a cover and a movable base, the eccentric rod can be contained in the internal part of the movable base, and the movable base can be contained in the internal part of a tube.

2. Description of Related Art

TW Patent No. M494340 entitled "Self-timer device" disclosed a self-timer device has a self-timer body and a joint assembly of electronic device. It is inconvenient to carry the self-timer device, because of the joint assembly has larger volume, and the joint assembly should influence the artistry of the self-timer device. Thus the self-timer device requires improvement. Moreover, US Patent publication No. 20130293731 entitled "Remote controller device for self-photography using a mobile phone camera" disclosed a remote controller device for self-photography has a mobile phone mounting part. The mounting part may partly cover a display of the mobile phone, because of the mounting part holds one side of the mobile phone from the front of the mobile phone. More particularly, the present mobile phone has a trend of narrower and narrower frame. Thus the way of mobile phone holding from the front still requires improvement.

SUMMARY OF THE INVENTION

It is therefore an object of the invention to provide an extension-type holder comprising a cover, a movable base, a tube and an extensible rod assembly, the cover has an eccentric rod, the movable base has an eccentric pipe, a rotating joint is disposed between the extensible rod assembly and the tube, wherein the eccentric pipe can contain the eccentric rod, the tube can contain the movable base, a holding space can be formed between a cover and a movable base when the eccentric rod and the movable base is in an extending state.

It is therefore another object of the invention to provide an extension-type holder comprising a cover, a movable base, a tube and an extensible rod assembly, the extension-type holder further comprises a handle, the handle has a bottom cover and a foldable stand, wherein the foldable stand can be contained in the internal part of the handle, and the extensible rod assembly can be contained in the internal part of the handle.

First advantages of the invention include the extension-type holder comprising a cover, a movable base, a tube and an extensible rod assembly, the cover has an eccentric rod, the movable base has an eccentric pipe, the eccentric pipe can contain the eccentric rod, and the tube can contain the movable base, therefore the extension-type holder is easy to carry. Second advantages of the invention include the extension-type holder comprising a cover, a movable base, a tube and an extensible rod assembly, the cover has an eccentric rod, the movable base has an eccentric pipe, the cover and the movable base will not partly cover a display of a mobile phone when the mobile phone is held by the cover and the movable base. Third advantages of the invention include the extension-type holder further comprising a handle, the handle can contain an extensible rod assembly and a foldable stand, thereby promoting the purpose of the extension-type holder.

The above and other objects, features and advantages of the invention will become apparent from the following detailed description taken with the accompanying drawings.

DETAILED DESCRIPTION OF THE INVENTION

Figure 1:
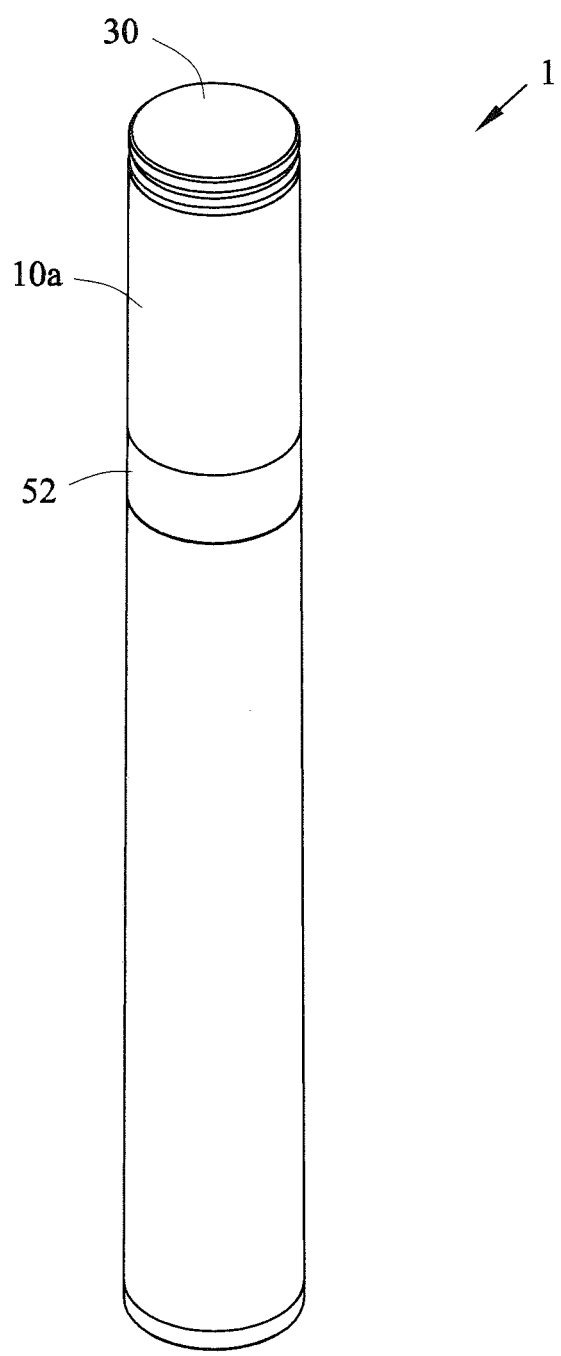
FIG. 1 is a perspective view showing a first preferred embodiment of the invention.
Figure 2:
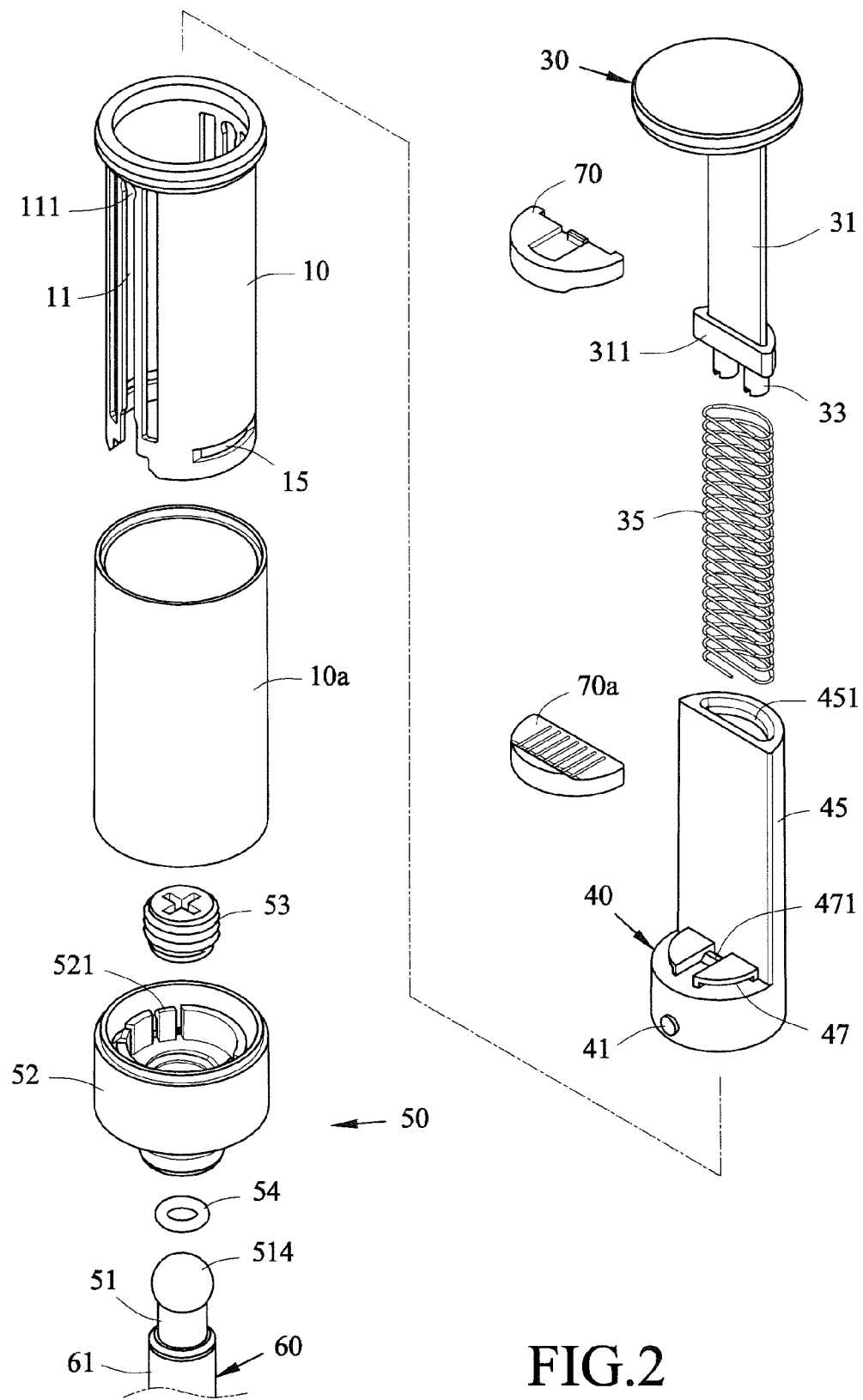
FIG. 2 is a partly exploded view showing the first preferred embodiment of the invention.
Figure 3:
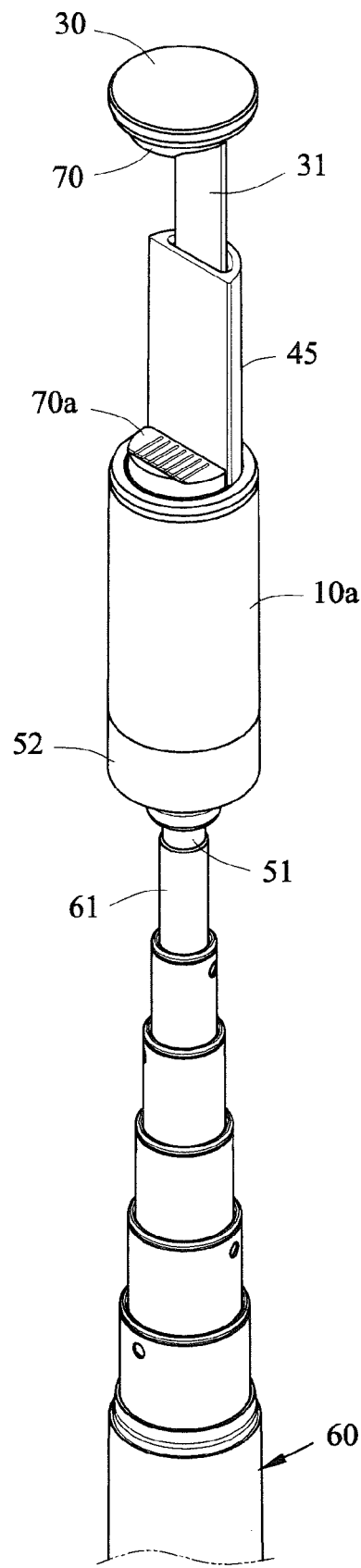
FIG. 3 is a using state view showing the first preferred embodiment of the invention.
Figure 4:
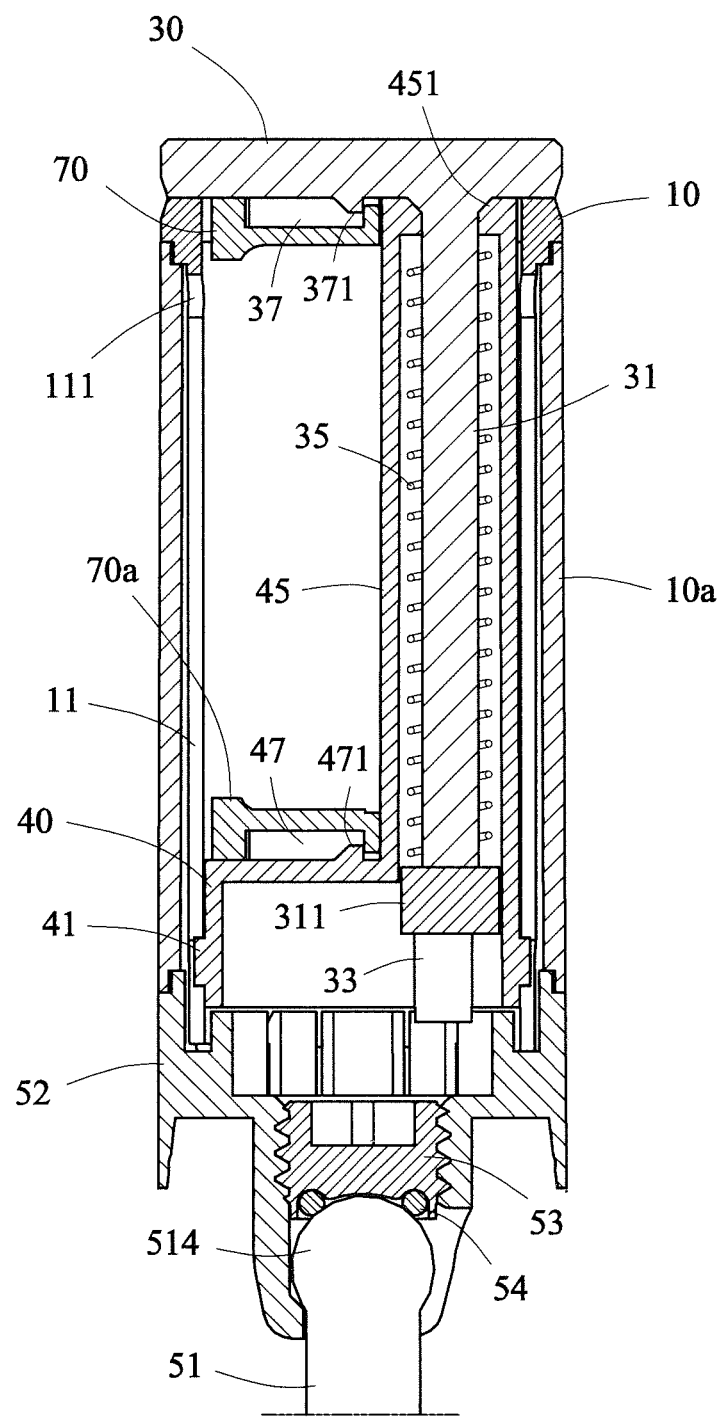
FIG. 4 is a partly cross-sectional view showing the first preferred embodiment of the invention when the first preferred embodiment is in a shortening state.
Figure 5:
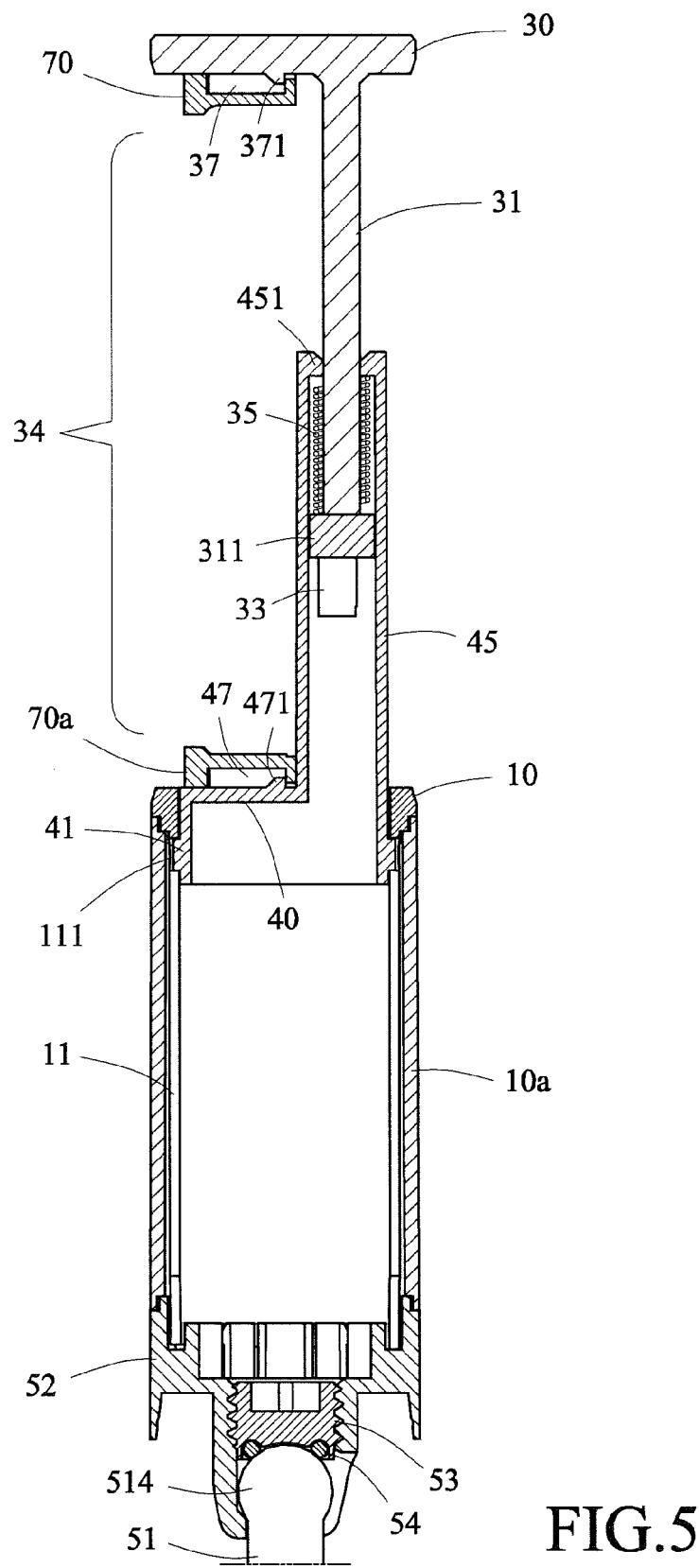
FIG. 5 is a partly cross-sectional view showing the first preferred embodiment of the invention when the first preferred embodiment is in an extension state.
Figure 6:
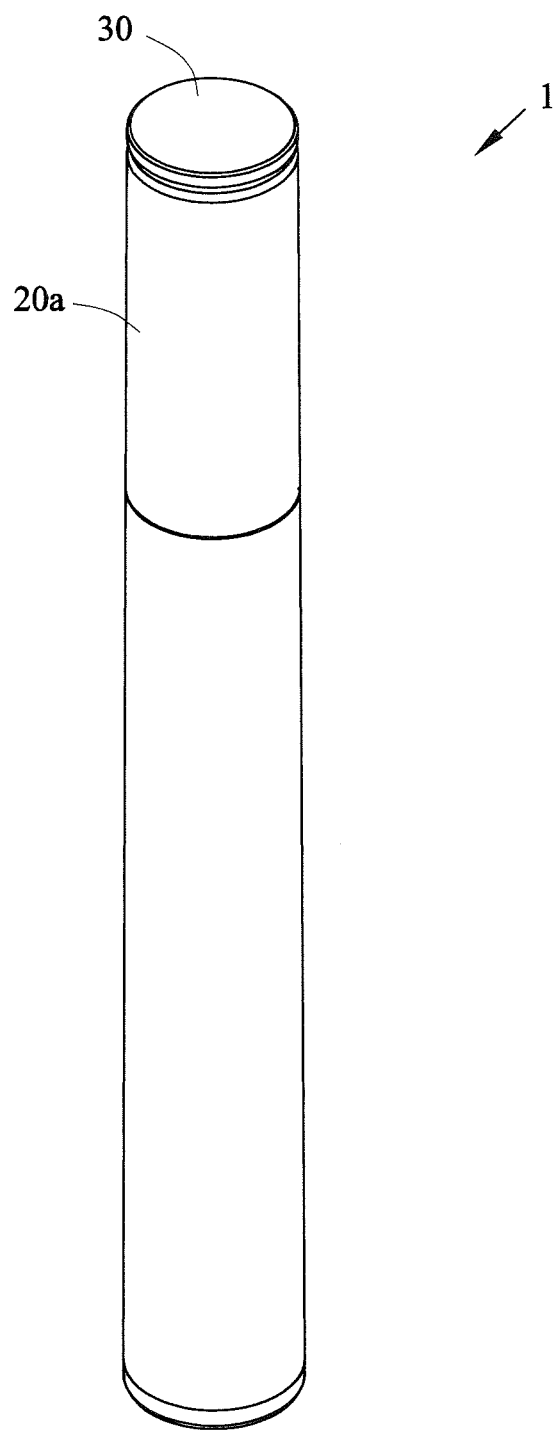
FIG. 6 is a perspective view showing a second preferred embodiment of the invention.
Figure 7:
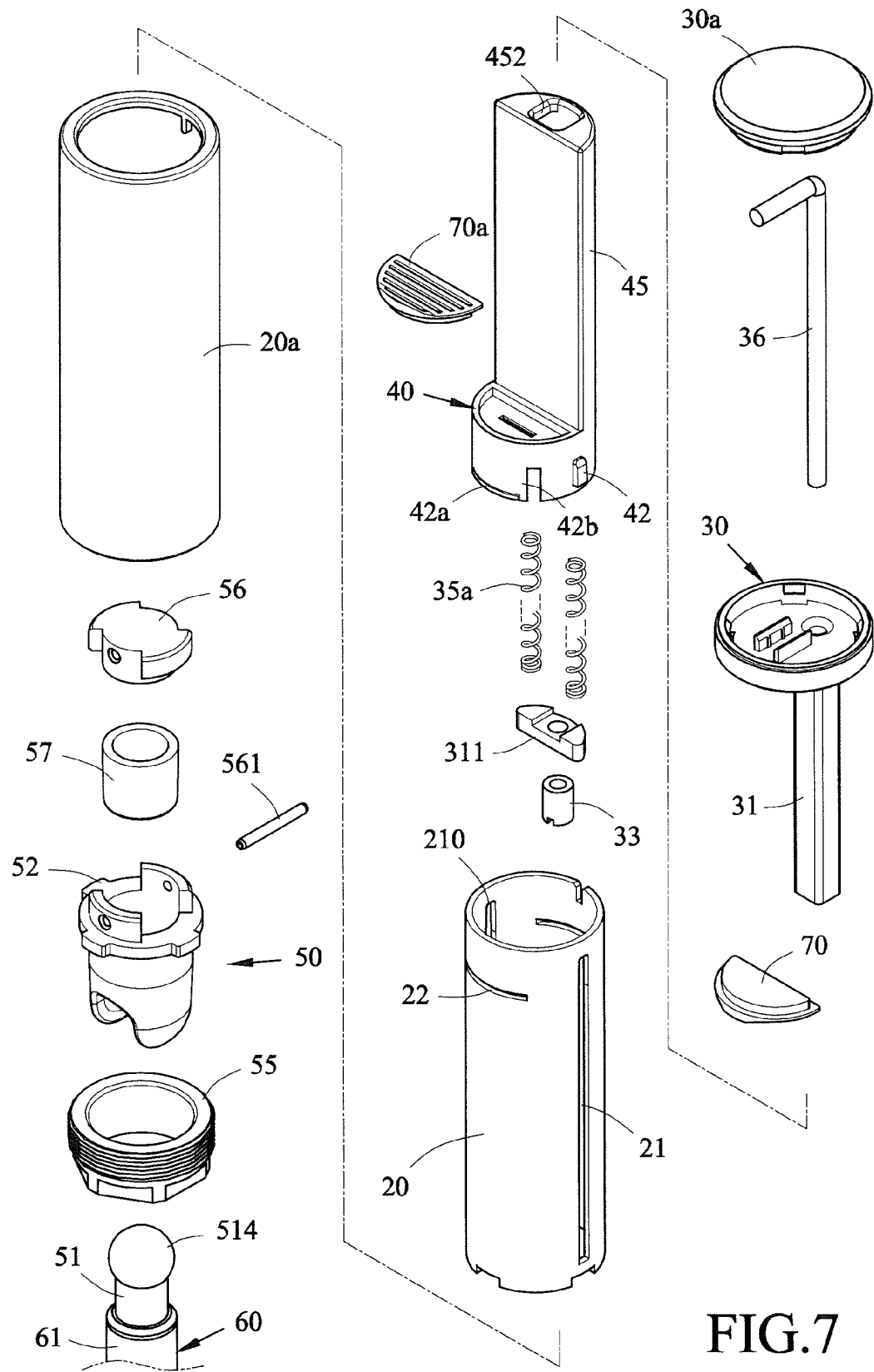
FIG. 7 is a partly exploded view showing the second preferred embodiment of the invention.
Figure 8:
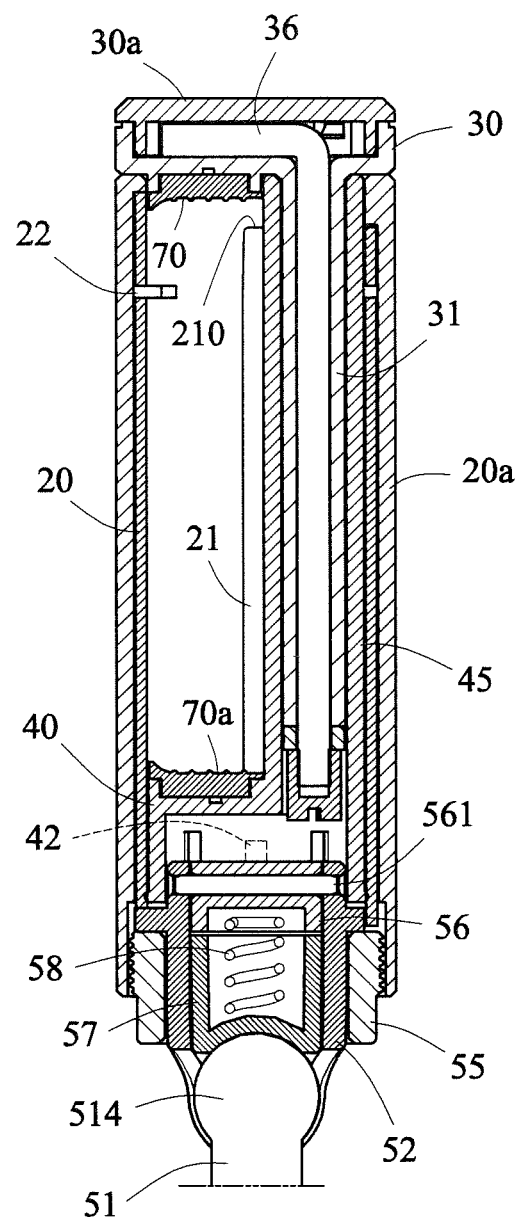
FIG. 8 is a partly cross-sectional view showing the second preferred embodiment of the invention when the second preferred embodiment is in a shortening state.
Figure 9:
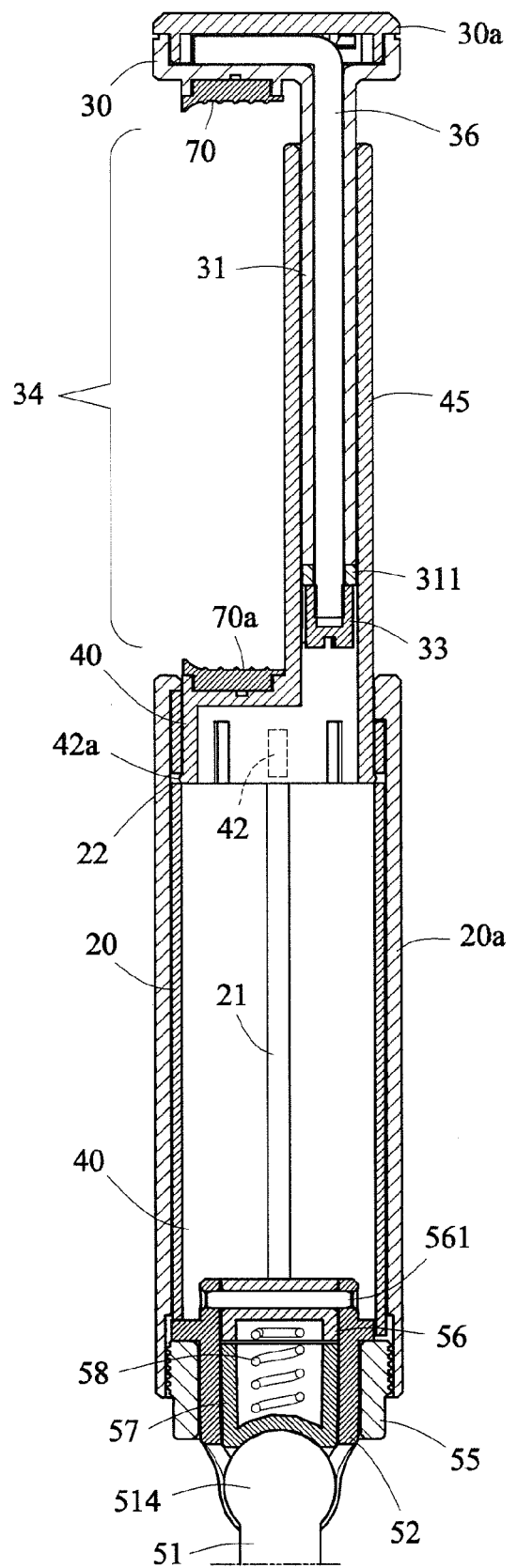
FIG. 9 is a partly cross-sectional view showing the second preferred embodiment of the invention when the second preferred embodiment is in an extension state.
Figure 10:
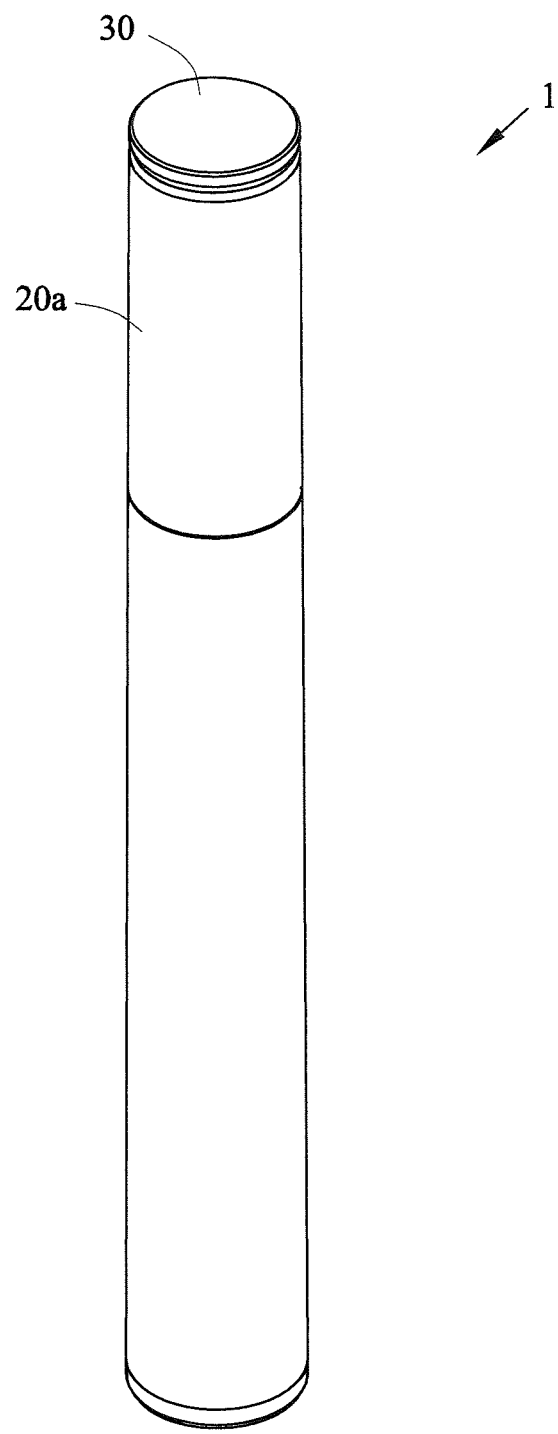
FIG. 10 is a perspective view showing a third preferred embodiment of the invention.
Figure 11:
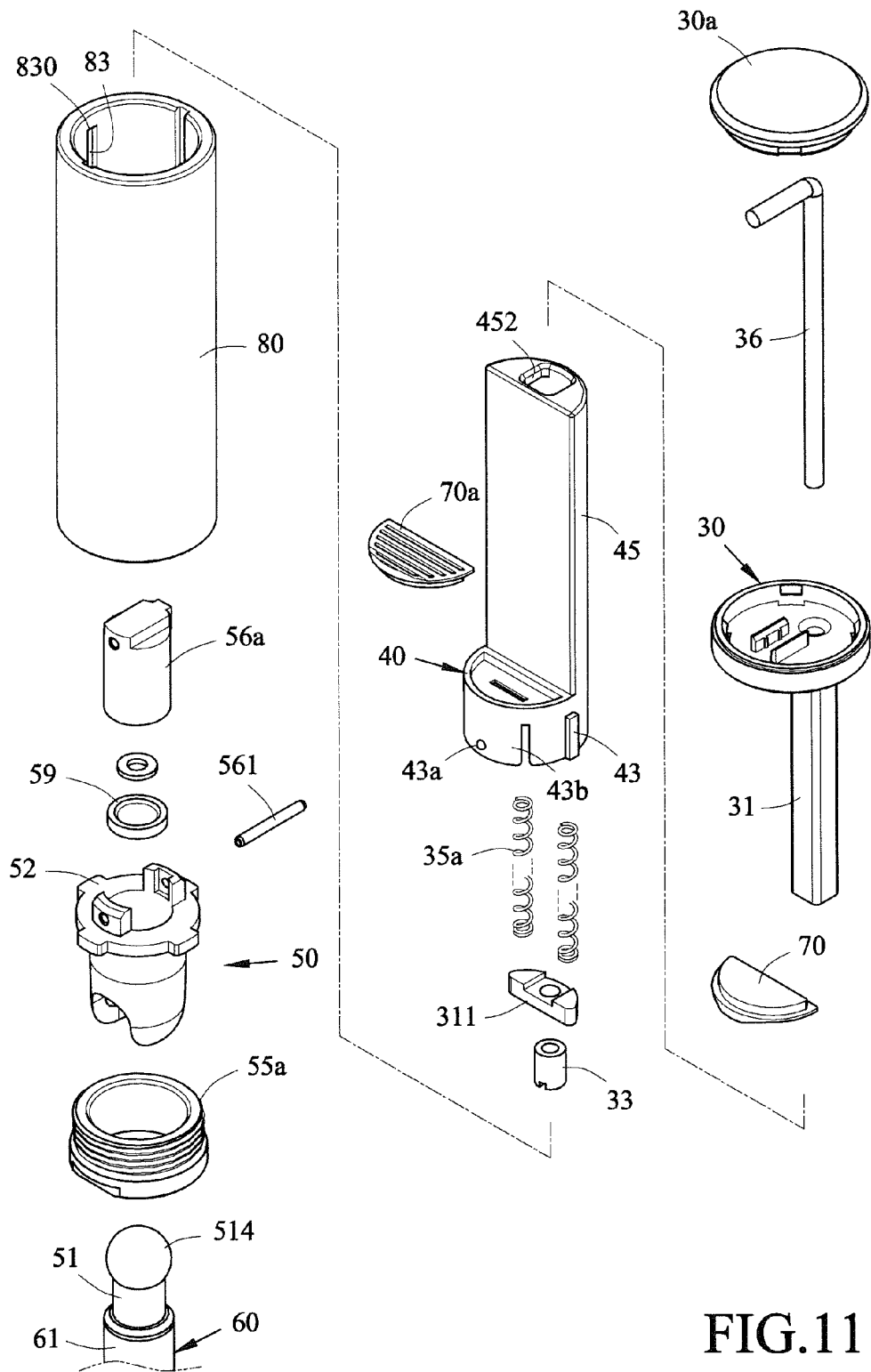
FIG. 11 is a partly exploded view showing the third preferred embodiment of the invention.
Figure 12:
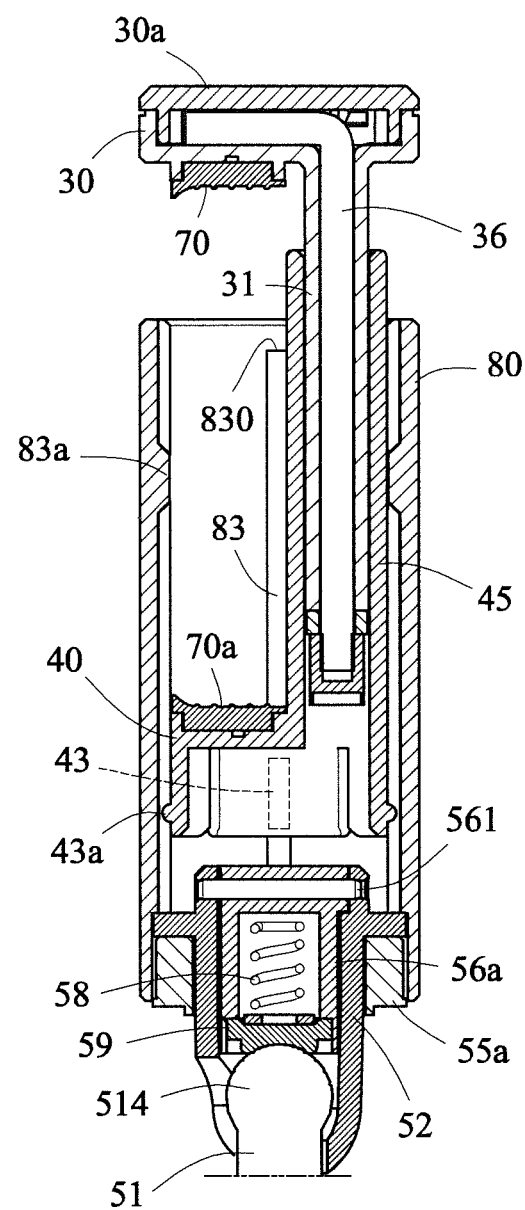
FIG. 12 is a partly cross-sectional view showing the third preferred embodiment of the invention when the third preferred embodiment is in a shortening state.
Figure 13:
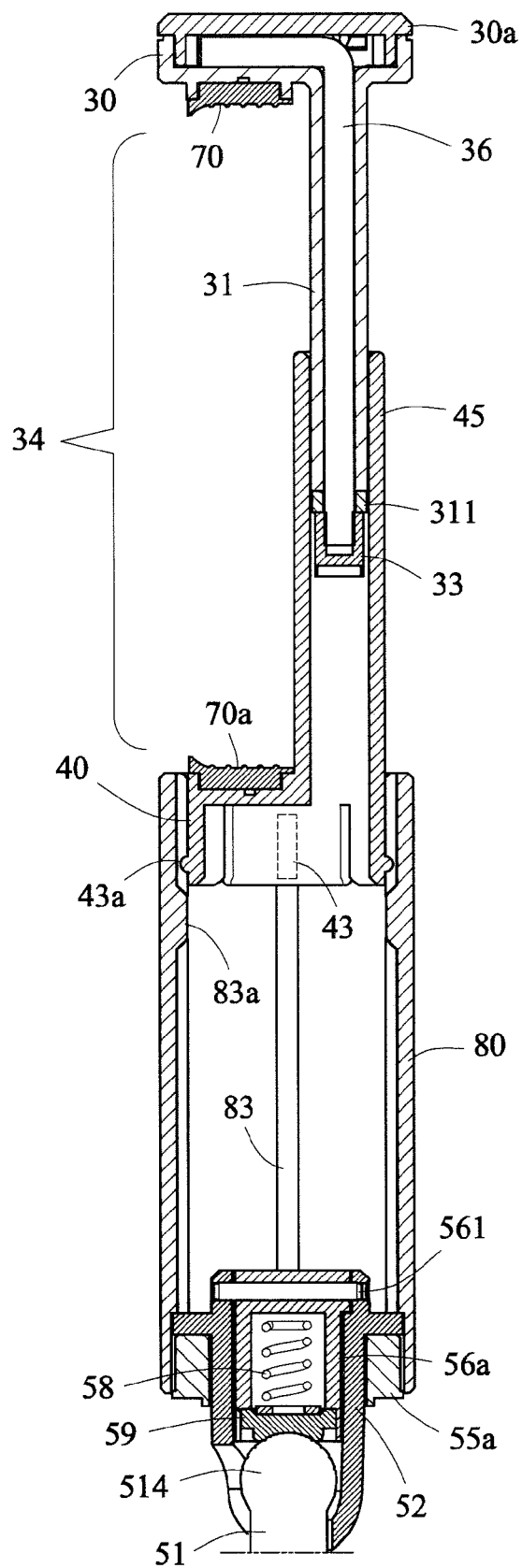
FIG. 13 is a partly cross-sectional view showing the third preferred embodiment of the invention when the third preferred embodiment is in an extension state.
Figure 14:
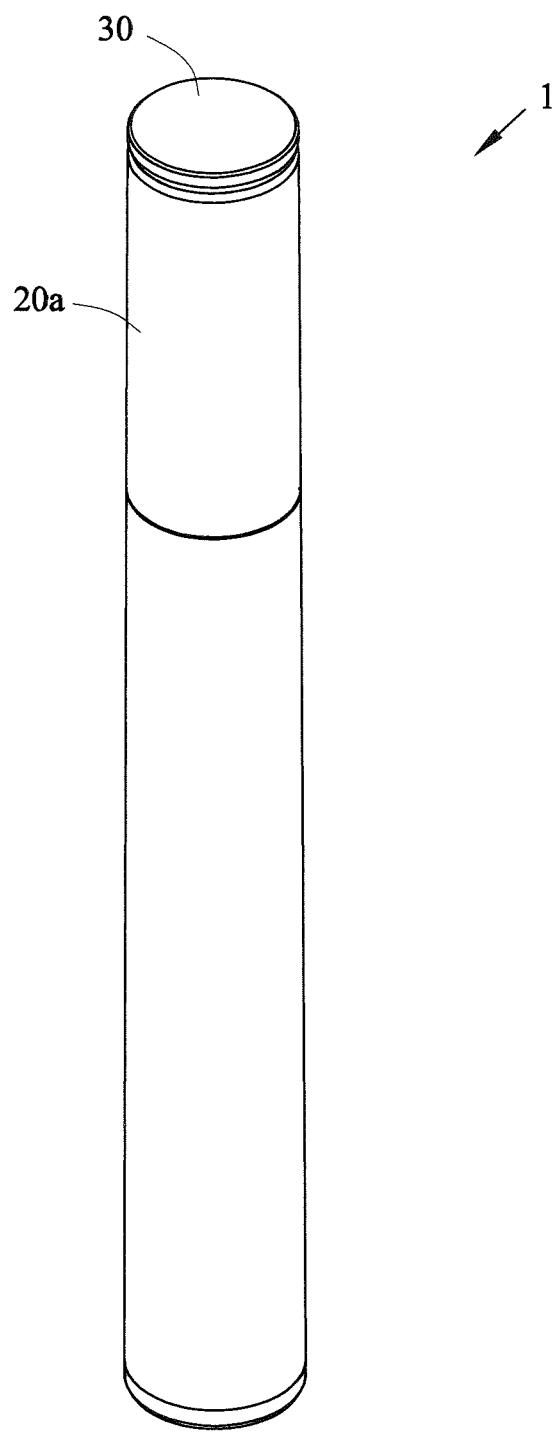
FIG. 14 is a perspective view showing a fourth preferred embodiment of the invention.
Figure 15:
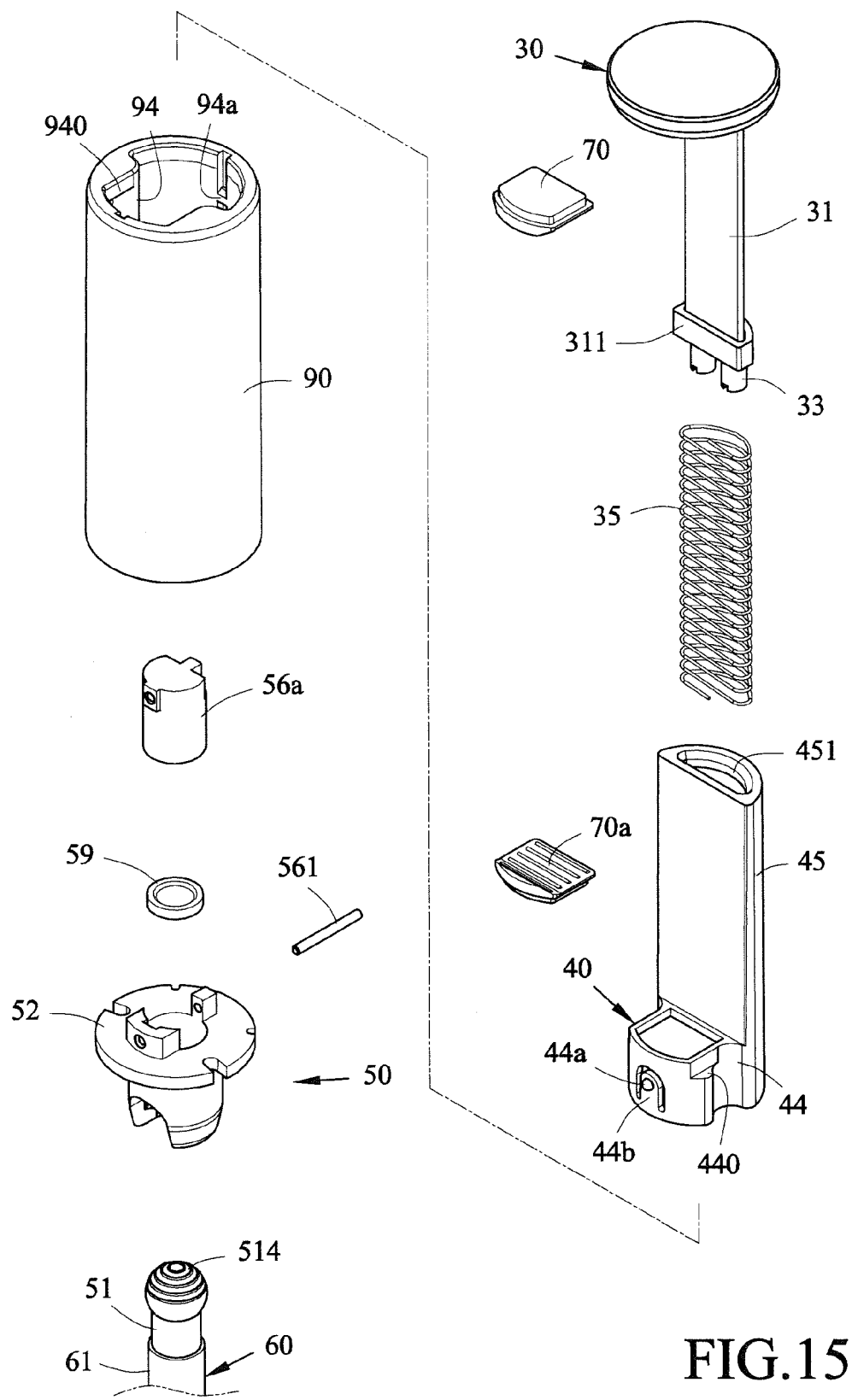
FIG. 15 is a partly exploded view showing the fourth preferred embodiment of the invention.
Figure 16:
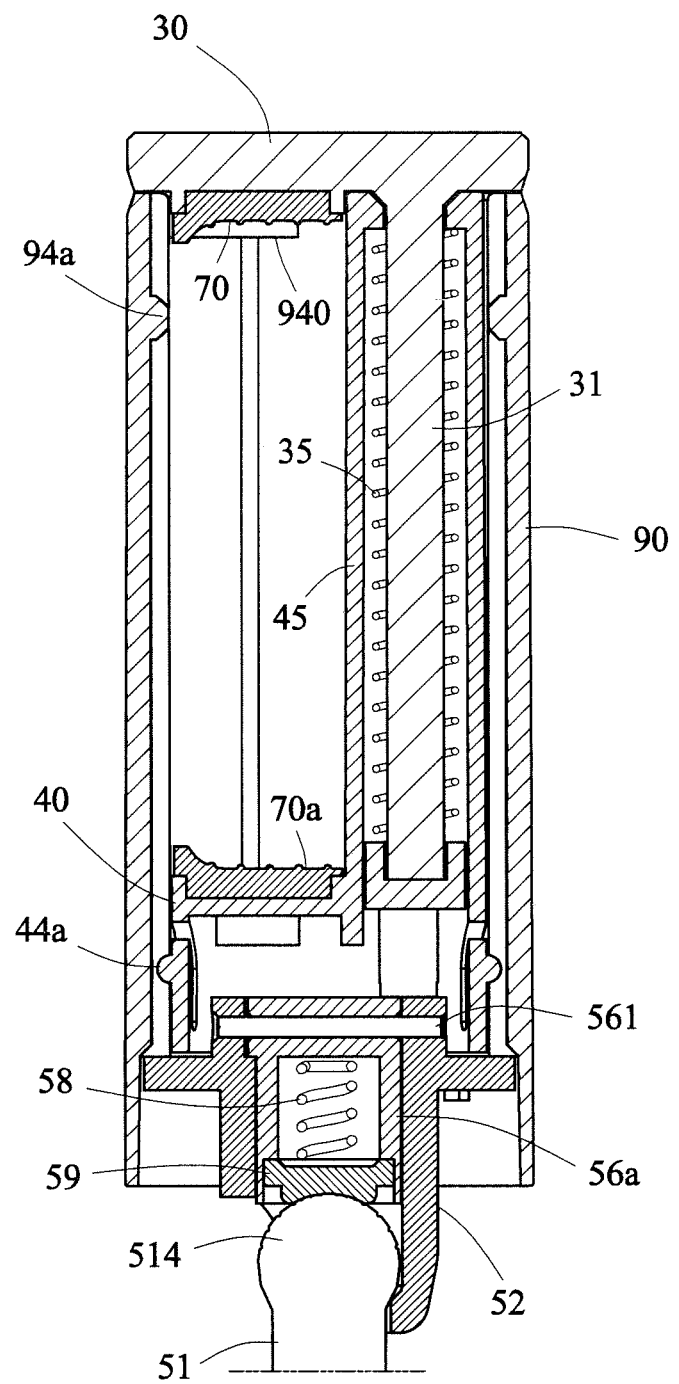
FIG. 16 is a partly cross-sectional view showing the fourth preferred embodiment of the invention when the fourth preferred embodiment is in a shortening state.
Figure 17:
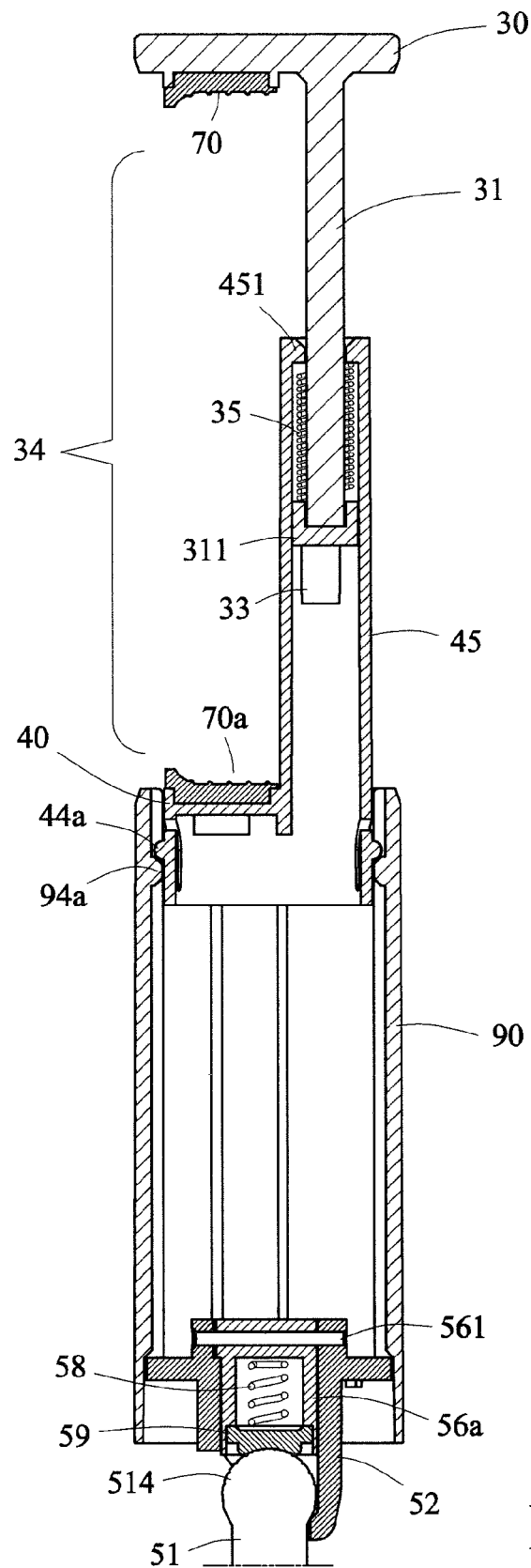
FIG. 17 is a partly cross-sectional view showing the fourth preferred embodiment of the invention when the fourth preferred embodiment is in an extension state.
Figure 18:
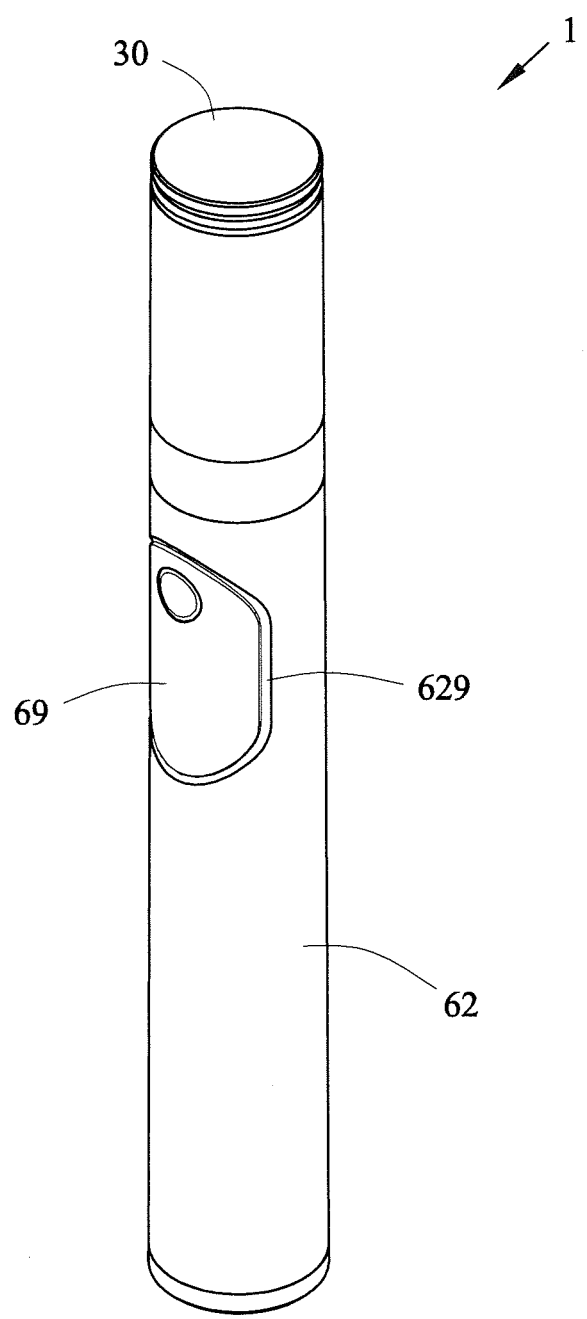
FIG. 18 is a perspective view showing a fifth preferred embodiment of the invention.
Figure 19:
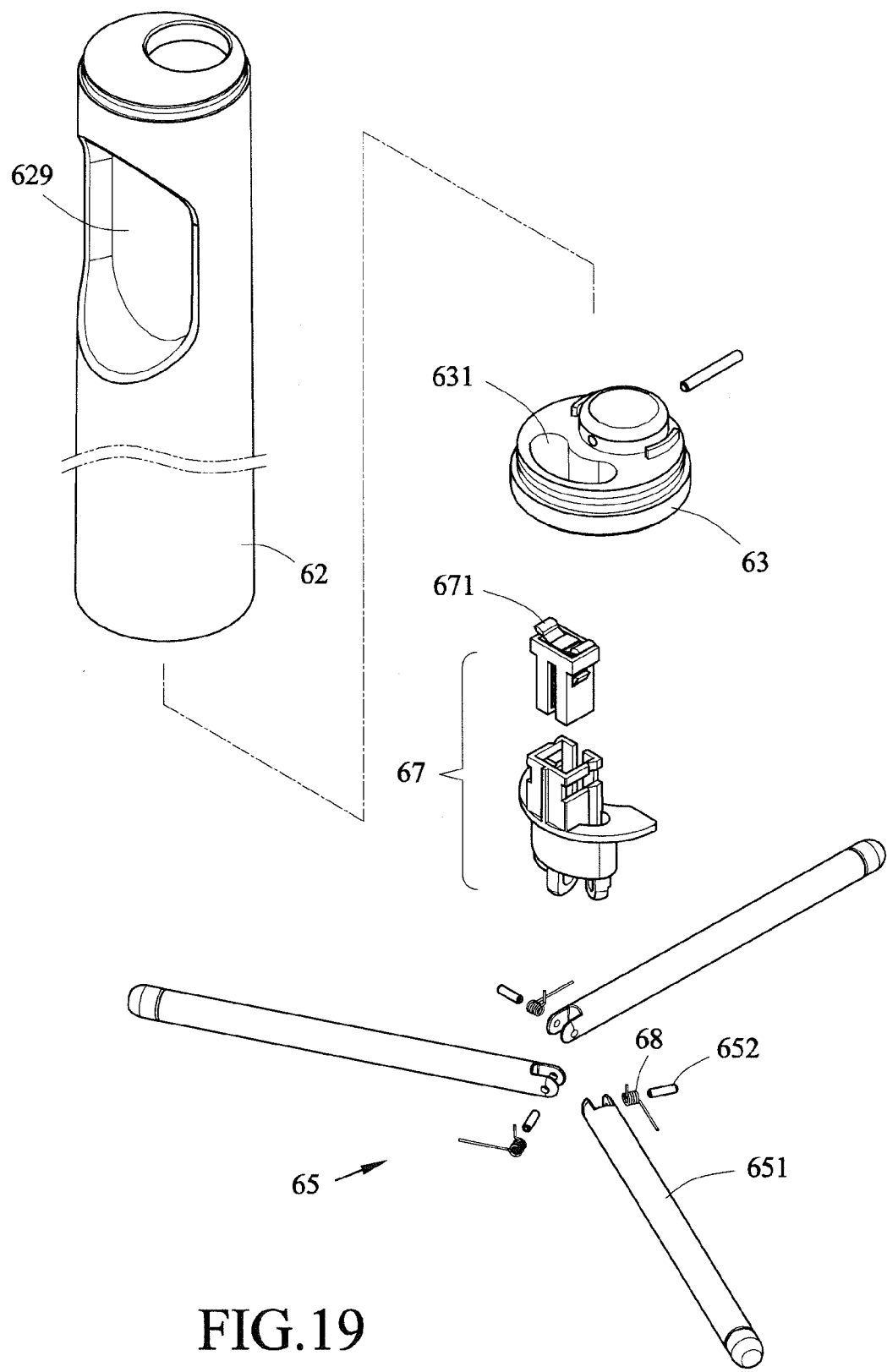
FIG. 19 is a partly exploded view showing the fifth preferred embodiment of the invention.
Figure 20:
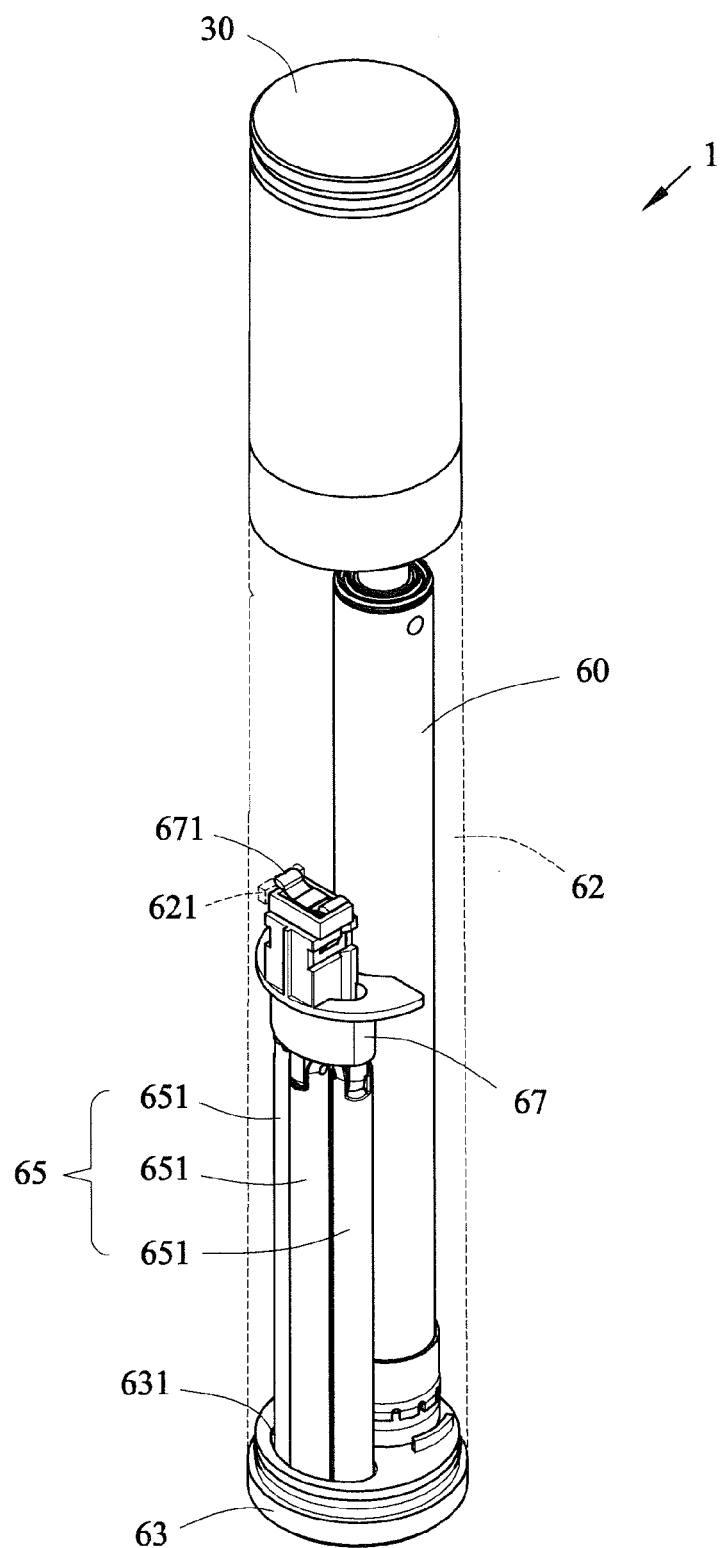
FIG. 20 is a state view showing the fifth preferred embodiment of the invention when a foldable stand of the fifth preferred embodiment is in a folding state.
Figure 21:
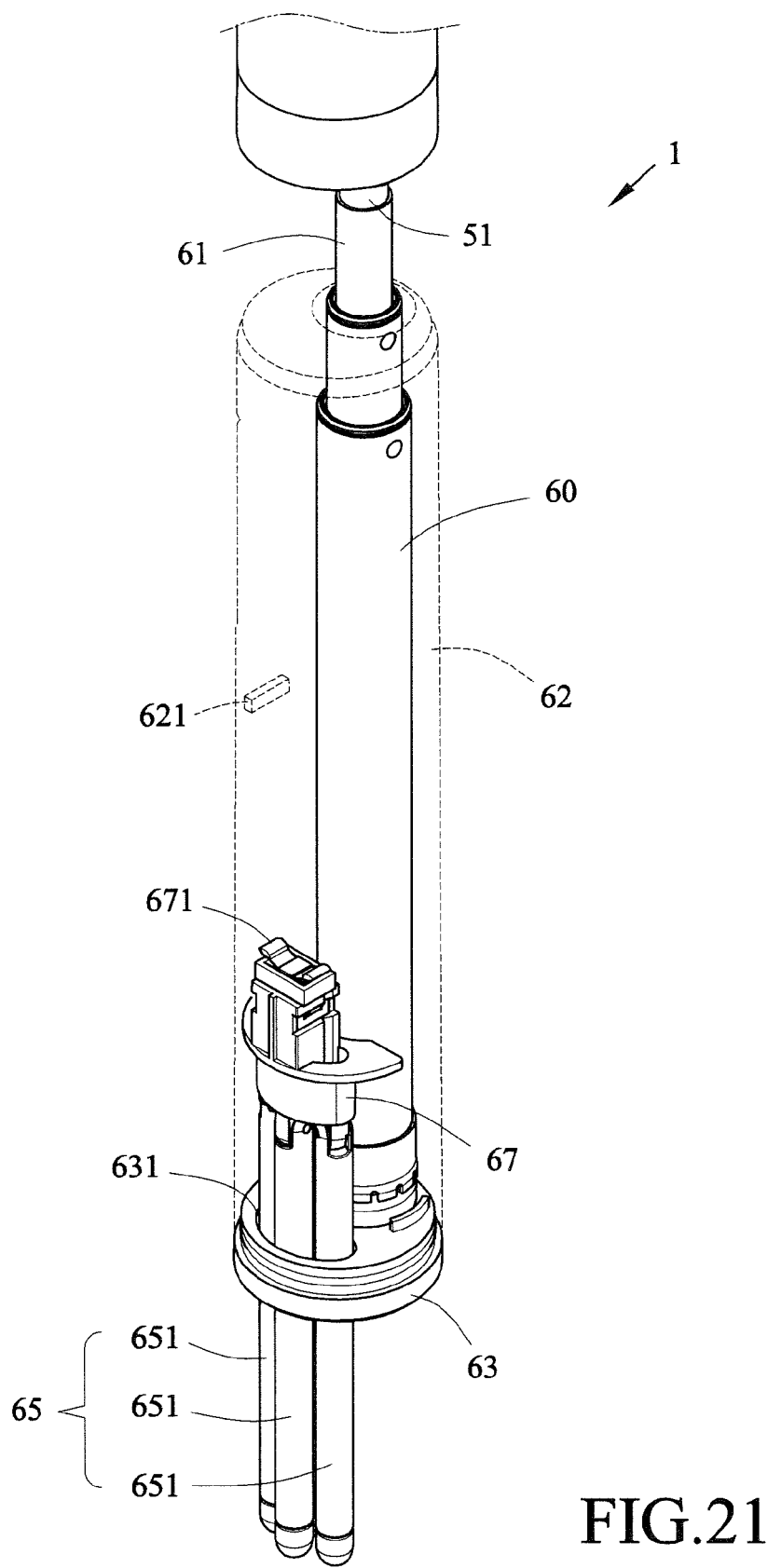
FIG. 21 is a state view showing the fifth preferred embodiment of the invention when the foldable stand of the fifth preferred embodiment begin to extend.
Figure 22:
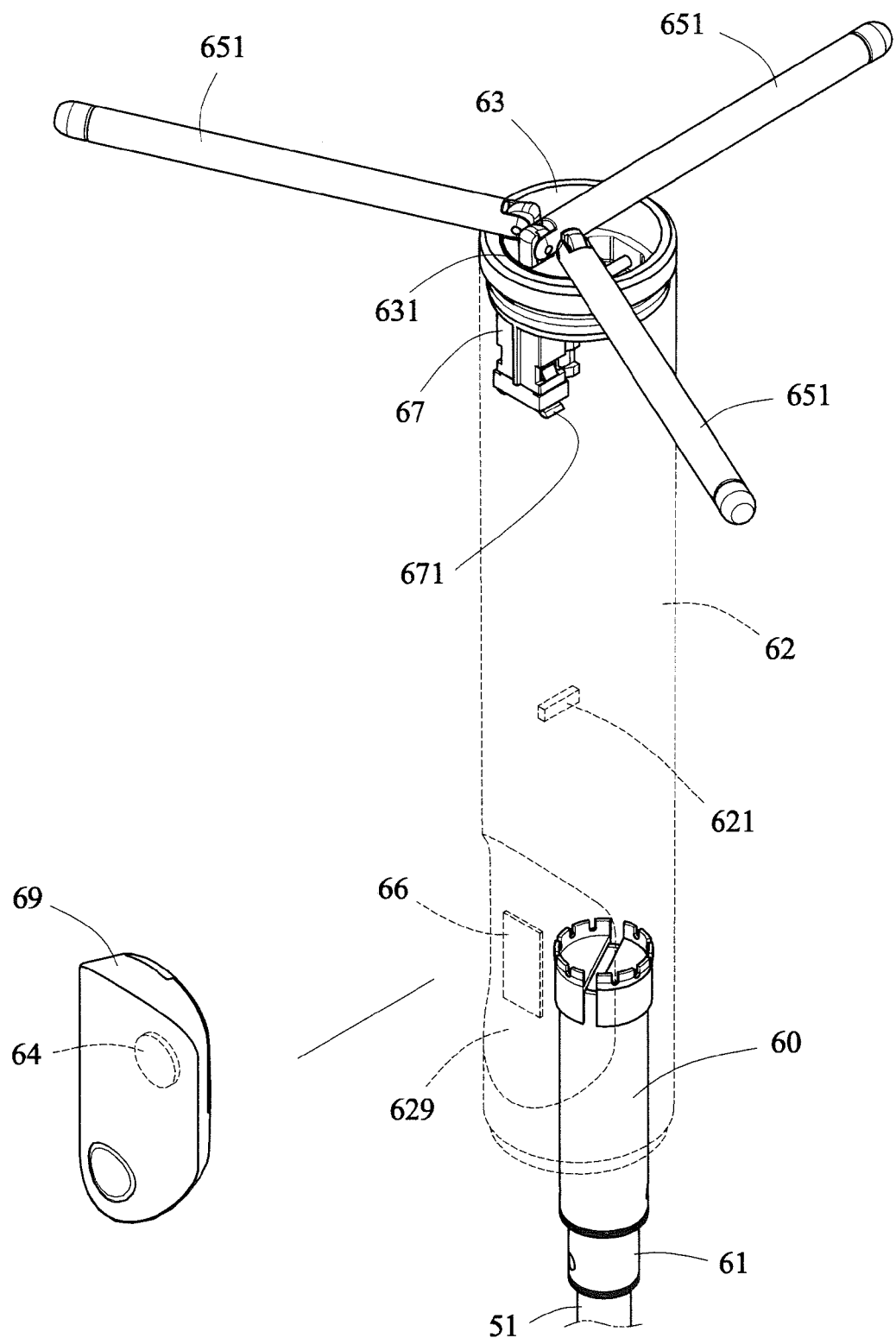
FIG. 22 is a state view showing the fifth preferred embodiment of the invention when the foldable stand of the fifth preferred embodiment is in an extending state.

Referring to FIGS. 1 to 5, an extension-type holder 1 in accordance with a first preferred embodiment of the invention comprises a first tube 10, a dressing tube 10a, a cover 30, a movable base 40, a rotating joint 50 and an extensible rod assembly 60, the cover 30 has an eccentric rod 31, the movable base 40 has an eccentric pipe 45, the eccentric pipe 45 can contain the eccentric rod 31, the first tube 10 has a first guiding slot 11, the first tube 10 can contain the movable base 40, and the movable base 40 can slide in the first tube 10, the dressing tube 10a is located on the outside of the first tube 10, the rotating joint 50 is disposed between the extensible rod assembly 60 and the first tube 10, therefore the first tube 10 has a capability of rotation, wherein a holding space 34 can be formed between the cover 30 and the movable base 40 when the eccentric rod 31 and the movable base 40 is in an extending state, the movable base 40 has at least one first guiding portion 41, the first guiding portion 41 can slide along the first guiding slot 11, thereby preventing rotation of the movable base 40.

Examples of the location manner of the movable base 40 will be illustrated below, the first tube 10 has at least one first location portion 111, the first guiding portion 41 can enter into the first location portion 111 when the movable base 40 is in an extending state, therefore the movable base 40 will obtain a location effect.

Examples of the eccentric rod 31 and the eccentric pipe 45 will be illustrated below, the eccentric rod 31 has a block 311, for example, the block 311 is embedded on an end of the eccentric rod 31, or the block 311 is fixed on an end of the eccentric rod 31 by a hook (not shown), or the block 311 is fixed on an end of the eccentric rod 31 by a screw 33. A restoring spring 35 is disposed between the block 311 and an inner flange 451 of the eccentric pipe 45, a distance from the inner flange 451 to the block 311 will be shortened when the eccentric rod 31 is in an extending state, therefore the restoring spring 35 will be compressed to form a holding force. Moreover, the eccentric rod 31 has a non-circular cross section, and the shape of the inner flange 451 can adapt to the cross section of the eccentric rod 31, thereby preventing the rotation of the eccentric rod 31 during the extending process. Furthermore, a pair of replaceable positioning elements 70, 70a respectively embed on the cover 30 and the movable base 40, for example, the cover 30 has at least one pair of inserting slot 37 and a first convex portion 371 to embed and dispose the positioning element 70, the movable base 40 has at least one pair of inserting slot 47 and another first convex portion 471 to embed and dispose the positioning element 70a.

Examples of the rotating joint 50 will be illustrated below, the rotating joint 50 can select from a universal joint or a pivot joint, a first terminal 51 of the rotating joint 50 is connected to a smallest tube 61 of the extensible rod assembly 60, a second terminal 52 of the rotating joint 50 can be fixed on the first tube 10 or the dressing tube 10a, for example, the second terminal 52 is fixed on a fixing hole 15 of the first tube 10 by a hook 521, or the second terminal 52 is screwed on the dressing tube 10a. Moreover, the first terminal 51 has a ball-shaped portion 514 when the rotating joint 50 is a universal joint, the second terminal 52 has a first screw 53 and an elastomer 54, the ball-shaped portion 514 can be pivoted on the second terminal 52, and the elastomer 54 can contact the ball-shaped portion 514, the friction of the elastomer 54 for the ball-shaped portion 514 is adjustable by the first screw 53.

Referring to FIGS. 6 to 9, an extension-type holder 1 in accordance with a second preferred embodiment of the invention comprises a second tube 20, a dressing tube 20a, a cover 30, a metal element 36, a movable base 40, a rotating joint 50 and an extensible rod assembly 60, the cover 30 has an eccentric rod 31, the metal element 36 is disposed in the internal part of the cover 30 and the eccentric rod 31, the cover 30 may has a dressing plane 30a, the movable base 40 has an eccentric pipe 45, the eccentric pipe 45 can contain the eccentric rod 31, the second tube 20 has a second guiding slot 21, the second tube 20 can contain the movable base 40, and the movable base 40 can slide in the second tube 20, the dressing tube 20a is located on the outside of the second tube 20, the rotating joint 50 is disposed between the extensible rod assembly 60 and the second tube 20, wherein a holding space 34 can be formed between the cover 30 and the movable base 40 when the eccentric rod 31 and the movable base 40 is in an extending state, the movable base 40 has at least one second guiding portion 42, the second guiding portion 42 can slide along the second guiding slot 21, thereby preventing rotation of the movable base 40.

Examples of the second tube 20 and the movable base 40 will be illustrated below, the second guiding slot 21 has a closed end 210, the closed end 210 can stop the second guiding portion 42, thereby preventing escape of the movable base 40 from the second tube 20. Moreover, the second tube 20 has at least one second location portion 22, the movable base 40 has at least one auxiliary location portion 42a, the auxiliary location portion 42a is located on a spring 42b of the movable base 40, the auxiliary location portion 42a can enter into the second location portion 22 when the movable base 40 is in an extending state, therefore the movable base 40 will be positioned.

Examples of the eccentric rod 31 and the eccentric pipe 45 will be illustrated below, the eccentric rod 31 has a block 311, for example, the block 311 is embedded on an end of the eccentric rod 31, or the block 311 is fixed on an end of the eccentric rod 31 by a hook (not shown), or the block 311 is fixed on an end of the eccentric rod 31 by a screw 33. A plurality of restoring springs 35a are disposed between the block 311 and an inner flange 452 of the eccentric pipe 45, the restoring springs 35a are located on both sides of the eccentric rod 31, a distance from the inner flange 452 to the block 311 will be shortened when the eccentric rod 31 is in an extending state, therefore the restoring springs 35a will be compressed to form a holding force. Moreover, the eccentric rod 31 has a non-circular cross section, and the shape of the inner flange 452 can adapt to the cross section of the eccentric rod 31, thereby preventing the rotation of the eccentric rod 31 during the extending process. Furthermore, a pair of replaceable positioning elements 70, 70a respectively embed on the cover 30 and the movable base 40.

Examples of the rotating joint 50 will be illustrated below, the rotating joint 50 can select from a universal joint or a pivot joint, a first terminal 51 of the rotating joint 50 is connected to a smallest tube 61 of the extensible rod assembly 60, a second terminal 52 of the rotating joint 50 can be fixed on the dressing tube 20a by a second screw 55. Moreover, the first terminal 51 has a ball-shaped portion 514 when the rotating joint 50 is a universal joint, the second terminal 52 has a fixing element 56 (e.g., the fixing element 56 will be fixed on the second terminal 52 by a dowel pin 561) and a POM (Poloxymethylene) element 57, the ball-shaped portion 514 is pivoted on the second terminal 52, a spring 58 is disposed between the fixing element 56 and the POM element 57, therefore the POM element 57 will form a friction force for the ball-shaped portion 514.

Referring to FIGS. 10 to 13, an extension-type holder 1 in accordance with a third preferred embodiment of the invention comprises a third tube 80, a cover 30, a movable base 40, a rotating joint 50 and an extensible rod assembly 60, the cover 30 has an eccentric rod 31, the movable base 40 has an eccentric pipe 45, the eccentric pipe 45 can contain the eccentric rod 31, the internal part of the third tube 80 has at least one third guiding slot 83, the third tube 80 can contain the movable base 40, and the movable base 40 can slide in the third tube 80, the rotating joint 50 is disposed between the extensible rod assembly 60 and the third tube 80, wherein a holding space 34 can be formed between the cover 30 and the movable base 40 when the eccentric rod 31 and the movable base 40 is in an extending state, the movable base 40 has at least one third guiding portion 43, the third guiding portion 43 can slide along the third guiding slot 83, thereby preventing rotation of the movable base 40.

Examples of the third tube 80 and the movable base 40 will be illustrated below, the third guiding slot 83 has a closed end 830, the closed end 830 can stop the third guiding portion 43, thereby preventing escape of the movable base 40 from the third tube 80. Moreover, the internal part of the third tube 80 has at least one third location portion 83a, the movable base 40 has at least one auxiliary location portion 43a, the auxiliary location portion 43a is located on a spring 43b of the movable base 40, the auxiliary location portion 43a can cross the third location portion 83a when the movable base 40 is in an extending state, therefore the movable base 40 will be positioned.

Examples of the cover 30 will be illustrated below, a metal element 36 is disposed in the cover 30 and the eccentric rod 31, thereby increasing strength of the eccentric rod 31, the configure manner of the metal element 36 can select from an interposing manner or insert molding manner. Moreover, the eccentric rod 31 and the eccentric pipe 45 are similar to the second preferred embodiment in substance.

Examples of the rotating joint 50 will be illustrated below, the rotating joint 50 can select from a universal joint or a pivot joint, a first terminal 51 of the rotating joint 50 is connected to a smallest tube 61 of the extensible rod assembly 60, a second terminal 52 of the rotating joint 50 can be fixed on the third tube 80 by a third screw 55a. Moreover, the first terminal 51 has a ball-shaped portion 514 when the rotating joint 50 is a universal joint, the second terminal 52 has a fixing element 56a (e.g., the fixing element 56a will be fixed on the second terminal 52 by a dowel pin 561) and an elastomer 59, the ball-shaped portion 514 is pivoted on the second terminal 52, a spring 58 is disposed between the fixing element 56a and the elastomer 59, therefore the elastomer 59 will form a friction force for the ball-shaped portion 514.

Referring to FIGS. 14 to 17, an extension-type holder 1 in accordance with a fourth preferred embodiment of the invention comprises a fourth tube 90, a cover 30, a movable base 40, a rotating joint 50 and an extensible rod assembly 60, the cover 30 has an eccentric rod 31, the movable base 40 has an eccentric pipe 45, the eccentric pipe 45 can contain the eccentric rod 31, the fourth tube 90 can contain the movable base 40, and the movable base 40 can slide in the fourth tube 90, the rotating joint 50 has a first terminal 51 and a second terminal 52, the second terminal 52 can be fixed on the fourth tube 90, a smallest tube 61 of the extensible rod assembly 60 is connected to the first terminal 51, wherein a holding space 34 can be formed between the cover 30 and the movable base 40 when the eccentric rod 31 and the movable base 40 is in an extending state, the movable base 40 has at least one fourth guiding slot 44, the internal part of the fourth tube 90 has at least one fourth guiding portion 94, shapes of the fourth guiding slot 44 and the fourth guiding portion 94 can adapt to each other, the fourth guiding slot 44 can slide along the fourth guiding portion 94, thereby preventing rotation of the movable base 40.

Examples of the fourth tube 90 and the movable base 40 will be illustrated below, the top of the fourth tube 90 has a block 940, the block 940 can stop a plane of the movable base 40, thereby preventing escape of the movable base 40 from the fourth tube 90. Moreover, the internal part of the fourth tube 90 has at least one fourth location portion 94a, the movable base 40 has at least one auxiliary location portion 44a, the auxiliary location portion 44a is located on a spring 44b of the movable base 40, the auxiliary location portion 44a can cross the fourth location portion 94a when the movable base 40 is in an extending state, therefore the movable base 40 will be positioned. Furthermore, the eccentric rod 31 and the eccentric pipe 45 are similar to the first preferred embodiment in substance.

Referring to FIGS. 18 to 22, an extension-type holder 1 in accordance with a fifth preferred embodiment of the invention further comprises a handle 62, the handle 62 has a bottom cover 63 and a foldable stand 65, the foldable stand 65 can be contained in the internal part of the handle 62, and an extensible rod assembly 60 can be contained in the internal part of the handle 62, wherein a plurality of legs 651 are pivoted on the foldable stand 65. After the legs 651 have been folded, the legs 651 can push into the handle 62 by a through hole 631 of the bottom cover 63.

Examples of the foldable stand 65 will be illustrated below, the foldable stand 65 has a push-push positioner 67, the legs 651 are pivoted on the push-push positioner 67. At least one hook 671 of the push-push positioner 67 can fix on at least one fixed block 621 in the handle 62, when the legs 651 push into the handle 62. The hook 671 can escape from the fixed block 621 when the push-push positioner 67 is pushed again. Moreover, a plurality of torque springs 68 respectively configure on a plurality of pivots 625, each torque spring 68 will push each leg 651 to unfold when the legs 651 are fully passed from the through hole 631 of the bottom cover 63.

Examples of the handle 62 will be illustrated below, one side of the handle 62 has a containing space 629, thereby containing a remote controller 69, the combination manner of the handle 62 and the remote controller 69 can select from a separable embedding manner or a separable magnetic attachment manner, for example, the remote controller 69 has a magnetic element 64, the internal part of the handle 62 has a metal plate 66, the remote controller 69 can be magnetically attached to the containing space 629 by a magnetic action of the magnetic element 64 and the metal plate 66.

Figure 23:
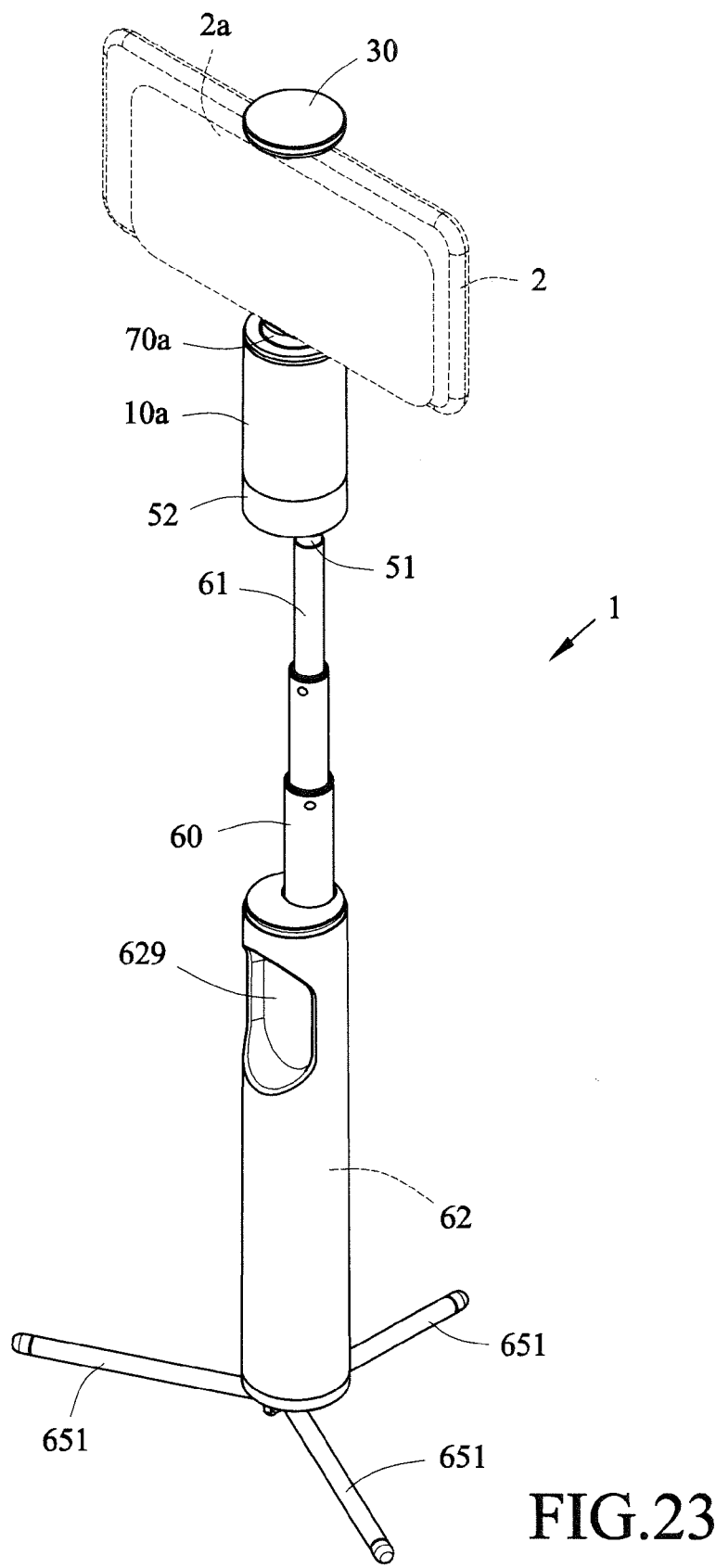
FIG. 23 is a state view showing the invention when the extension-type holder holds a mobile phone.

Referring to FIG. 23, an extension-type holder 1 of the invention can hold a mobile phone 2, the cover 30 and the movable base 40 will not partly cover a display 2a of the mobile phone 2 when it is held by the cover 30 and the movable base 40.

What is claimed is:
1. An extension-type holder comprising:
   a cover having an eccentric rod;
   a movable base having an eccentric pipe, wherein the eccentric rod can be contained in the eccentric pipe;
   a tube having at least one guiding slot, wherein the movable base can be contained in the tube, and the movable base can slide in the tube;
   a dressing tube, wherein the dressing tube is located on an outside of the tube; and an extensible rod assembly and a rotating joint, wherein the rotating joint is disposed between the extensible rod assembly and the tube;

wherein a holding space can be formed between the cover and the movable base when the eccentric rod and the movable base is in an extending state, the movable base has at least one guiding portion, and the guiding portion can slide along the guiding slot, thereby preventing rotation of the movable base.

2. The extension-type holder of claim 1, wherein the tube has at least one location portion, the guiding portion can enter into the location portion, and therefore the movable base will be positioned.

3. The extension-type holder of claim 1, wherein the eccentric rod has a block, a restoring spring is disposed between the block and an inner flange of the eccentric pipe, the eccentric rod has a non-circular cross section, and a shape of the inner flange can adapt to the cross section of the eccentric rod, and a pair of replaceable positioning elements are respectively embedded on the cover and the movable base.

4. The extension-type holder of claim 1, wherein the rotating joint can be a universal joint or a pivot joint, a first terminal of the rotating joint is connected to a smallest tube of the extensible rod assembly, and a second terminal of the rotating joint can be fixed on the tube or the dressing tube.

5. The extension-type holder of claim 4, wherein the first terminal has a ball-shaped portion, the second terminal has a screw and an elastomer, the ball-shaped portion can be pivoted on the second terminal, the friction of the elastomer for the ball-shaped portion is adjustable by the screw.

6. An extension-type holder comprising:
a cover having an eccentric rod;
a metal element, wherein the metal element is disposed in the cover and the eccentric rod;
a movable base having an eccentric pipe, wherein the eccentric rod can be contained in the eccentric pipe;
a tube having at least one guiding slot, wherein the movable base can be contained in the tube, and the movable base can slide in the tube;
a dressing tube, wherein the dressing tube is located on outside of the tube; and
an extensible rod assembly and a rotating joint, wherein the rotating joint is disposed between the extensible rod assembly and the tube;
wherein a holding space can be formed between the cover and the movable base when the eccentric rod and the movable base is in an extending state, the movable base has at least one guiding portion, and the guiding portion can slide along the guiding slot, thereby preventing rotation of the movable base.

7. The extension-type holder of claim 6, wherein the guiding slot has a closed end, and the closed end can stop the guiding portion, thereby preventing escape of the movable base from the tube.

8. The extension-type holder of claim 6, wherein the tube has at least one location portion, the movable base has at least one auxiliary location portion, the auxiliary location portion is located on a spring of the movable base, the auxiliary location portion can enter into the location portion, and therefore the movable base will be positioned.

9. The extension-type holder of claim 6, wherein the eccentric rod has a block, a plurality of restoring springs are disposed between the block and an inner flange of the eccentric pipe, the restoring springs are located on both sides of the eccentric rod, the eccentric rod has a non-circular cross section, and shape of the inner flange can adapt to the cross section of the eccentric rod, and a pair of replaceable positioning elements are respectively embedded on the cover and the movable base.

10. The extension-type holder of claim 6, wherein the rotating joint can be a universal joint or a pivot joint, a first terminal of the rotating joint is connected to a smallest tube of the extensible rod assembly, and a second terminal of the rotating joint can be fixed on the dressing tube by a screw.

11. The extension-type holder of claim 10, wherein the first terminal has a ball-shaped portion, the second terminal has a fixing element and a POM (Poloxymethylene) element, the ball-shaped portion is pivoted on the second terminal, a spring is disposed between the fixing element and the POM element, and the POM element will form a friction force for the ball-shaped portion.

12. An extension-type holder comprising:
a cover having an eccentric rod;
a movable base having an eccentric pipe, wherein the eccentric rod can be contained in the eccentric pipe;
a tube having at least one guiding slot, wherein the movable base can be contained in the tube, and the movable base can slide in the tube; and
an extensible rod assembly and a rotating joint, wherein the rotating joint is disposed between the extensible rod assembly and the tube;
wherein a holding space can be formed between the cover and the movable base when the eccentric rod and the movable base is in an extending state, the movable base has at least one guiding portion, and the guiding portion can slide along the guiding slot, thereby preventing rotation of the movable base.

13. The extension-type holder of claim 12, wherein the guiding slot has a closed end, and the closed end can stop the guiding portion, thereby preventing escape of the movable base from the tube.

14. The extension-type holder of claim 12, wherein internal part of the tube has at least one location portion, the movable base has at least one auxiliary location portion, the auxiliary location portion is located on a spring of the movable base, the auxiliary location portion can cross the location portion, and therefore the movable base will be positioned.

15. The extension-type holder of claim 12, wherein a metal element is disposed in the cover and the eccentric rod, thereby increasing a strength of the eccentric rod, and the metal element can be configured by interposition or insert molding the metal element in the cover and eccentric rod.

16. The extension-type holder of claim 12, wherein the eccentric rod has a block, a plurality of restoring springs are disposed between the block and an inner flange of the eccentric pipe, the restoring springs are located on both sides of the eccentric rod, the eccentric rod has a non-circular cross section, a shape of the inner flange can adapt to the cross section of the eccentric rod, and a pair of replaceable positioning elements are respectively embedded on the cover and the movable base.

17. The extension-type holder of claim 12, wherein the rotating joint can be a universal joint or a pivot joint, a first terminal of the rotating joint is connected to a smallest tube of the extensible rod assembly, and a second terminal of the rotating joint can be fixed on the tube by a screw.

18. The extension-type holder of claim 17, wherein the first terminal has a ball-shaped portion, the second terminal has a fixing element and an elastomer, the ball-shaped portion is pivoted on the second terminal, a spring is disposed between the fixing element and the elastomer, and therefore the elastomer will form a friction force for the ball-shaped portion.

19. An extension-type holder comprising:
   a cover having an eccentric rod;
   a movable base having an eccentric pipe, wherein the eccentric rod can be contained in the eccentric pipe;
   a tube, wherein the movable base can be contained in the tube, and the movable base can slide in the tube;
   a rotating joint having a first terminal and a second terminal, wherein the second terminal can be fixed on the tube; and
   an extensible rod assembly, wherein a smallest tube of the extensible rod assembly is connected to the first terminal;
   wherein a holding space can be formed between the cover and the movable base when the eccentric rod and the movable base is in an extending state, the movable base has at least one guiding slot, internal part of the tube has at least one guiding portion, shape of the guiding slot can adapt to shape of the guiding portion, the guiding slot can slide along the guiding portion, thereby preventing rotation of the movable base.

20. The extension-type holder of claim 19, wherein a top of the tube has a block, and the block can stop a plane of the movable base, thereby preventing escape of the movable base from the tube.

21. The extension-type holder of claim 19, wherein the internal part of the tube has at least one location portion, the movable base has at least one auxiliary location portion, the auxiliary location portion is located on a spring of the movable base, and the auxiliary location portion can cross the location portion, therefore the movable base will be positioned.

22. The extension-type holder of claim 19, wherein the eccentric rod has a block, a restoring spring is disposed between the block and an inner flange of the eccentric pipe, the eccentric rod has a non-circular cross section, and shape of the inner flange can adapt to the cross section of the eccentric rod, and a pair of replaceable positioning elements are respectively embedded on the cover and the movable base.

23. An extension-type holder comprising:
   a cover having an eccentric rod;
   a movable base having an eccentric pipe, wherein the eccentric rod can be contained in the eccentric pipe;
   a tube, wherein the movable base can be contained in the tube, and the movable base can slide in the tube;
   a handle having a bottom cover and a foldable stand, wherein the foldable stand can be contained in the handle;
   an extensible rod assembly, wherein the extensible rod assembly can be contained in the handle; and
   a rotating joint, wherein the rotating joint is disposed between the extensible rod assembly and the tube;
   wherein a holding space can be formed between the cover and the movable base when the eccentric rod and the movable base is in an extending state, a plurality of legs are pivoted on the foldable stand, and the legs can push into the handle by a through hole of the bottom cover when the legs have been folded.

24. The extension-type holder of claim 23, wherein the foldable stand has a push-push mechanism, the legs are pivoted on the push-push mechanism, at least one hook of the push-push mechanism can be fixed on at least one fixed block of the handle when the legs push into the handle, and the hook can escape from the fixed block when the push-push mechanism is pushed again.

25. The extension-type holder of claim 23, wherein a plurality of torque springs respectively configure on a plurality of pivots of the legs, and each torque spring will push each leg to unfold when the legs are fully passed from the through hole of the bottom cover.

26. The extension-type holder of claim 23, wherein one side of the handle has a containing space, and a remote controller is separably embedded into the containing space, or the remote controller is magnetically attached to the containing space by a magnetic element of the remote controller and a metal plate of the handle.

* * * * *